United States Patent
Saliba et al.

(10) Patent No.: US 10,481,888 B2
(45) Date of Patent: Nov. 19, 2019

(54) METHOD FOR MANAGING AN ARCHITECTURE AND ASSOCIATED ARCHITECTURE

(71) Applicant: THALES, Courbevoie (FR)

(72) Inventors: Eric Saliba, Gennevilliers (FR); Emmanuel Gureghian, Gennevilliers (FR); Cédric Nortier, Gennevilliers (FR)

(73) Assignee: THALES, Courbevoie (FR)

(*) Notice: Subject to any disclaimer, the term of this patent is extended or adjusted under 35 U.S.C. 154(b) by 1 day.

(21) Appl. No.: 14/951,963

(22) Filed: Nov. 25, 2015

(65) Prior Publication Data
US 2016/0154640 A1   Jun. 2, 2016

(30) Foreign Application Priority Data

Nov. 27, 2014   (FR) .................................. 14 02700

(51) Int. Cl.
  *G06F 9/455*  (2018.01)
  *H04L 29/06*  (2006.01)
  (Continued)

(52) U.S. Cl.
  CPC ............... *G06F 8/61* (2013.01); *G06F 9/455* (2013.01); *G06F 9/5077* (2013.01); *G06F 21/53* (2013.01);
  (Continued)

(58) Field of Classification Search
  CPC ..... G06F 8/20; G06F 8/36; G06F 8/60; G06F 8/61; G06F 8/71; G06F 9/445;
  (Continued)

(56) References Cited

U.S. PATENT DOCUMENTS 8,468,535 B1 *  6/2013  Keagy ................. G06F 8/63
                                            718/104
9,037,511 B2 *  5/2015  Roth ................... G06F 21/602
                                            705/1.1
(Continued)

FOREIGN PATENT DOCUMENTS

EP    1906333 A2    4/2008
EP    2677425 A1   12/2013
WO    2006/103687 A1  10/2006

OTHER PUBLICATIONS

Rajalakshmi et al., Integer partitioning based encryption for privacy preservation in data mining, 6 pages (Year: 2012).*

(Continued)

*Primary Examiner* — Thuy Dao
(74) *Attorney, Agent, or Firm* — Troutman Sanders LLP

(57) ABSTRACT

The invention relates to a method for managing an architecture, wherein the architecture comprises a main platform including a plurality of partitions for executing software, and at least one secondary platform. The method further comprises at least one step of associating each partition of the main platform with at least one processing member by installing, for each partition and each processing member, a driver specific to the relevant partition, the driver ensuring a secured link between the relevant partition and the operating member(s) with which the partition is associated.

9 Claims, 1 Drawing Sheet

(51) Int. Cl.
  *G06F 9/50* (2006.01)
  *G06F 3/06* (2006.01)
  *G06F 8/61* (2018.01)
  *G06F 21/53* (2013.01)

(52) U.S. Cl.
  CPC .............. *G06F 2221/2141* (2013.01); *G06F 2221/2149* (2013.01)

(58) Field of Classification Search
  CPC ...... G06F 13/00; G06F 13/24; G06F 13/4081; G06F 8/63; G06F 8/65; G06F 9/45505; G06F 9/5011; G06F 9/45558; G06F 9/45533; G06F 9/455; G06F 9/5077; G06F 21/53; H04N 19/436; H04N 19/44; H04N 19/61; H04N 19/172; H04N 19/176
  See application file for complete search history.

(56) References Cited

U.S. PATENT DOCUMENTS

| | | | | |
|---|---|---|---|---|
| 9,165,139 | B2* | 10/2015 | Wade | G06F 21/54 |
| 9,235,707 | B2* | 1/2016 | Zimmer | G06F 9/5077 |
| 9,389,895 | B2* | 7/2016 | Oshins | G06F 9/45537 |
| 9,501,315 | B2* | 11/2016 | Desai | H04L 67/306 |
| 9,684,545 | B2* | 6/2017 | Beale | G06F 16/13 |
| 9,836,295 | B1* | 12/2017 | Hoffman | G06F 8/61 |
| 10,019,273 | B2* | 7/2018 | Robinson | G06F 21/53 |
| 10,296,392 | B2* | 5/2019 | Heil | G06F 9/5027 |
| 2008/0005791 | A1* | 1/2008 | Gupta | G06F 21/562 726/15 |
| 2008/0022094 | A1* | 1/2008 | Gupta | H04L 63/0485 713/165 |
| 2009/0113202 | A1* | 4/2009 | Hidle | H04L 63/0428 713/151 |
| 2009/0172328 | A1* | 7/2009 | Sahita | G06F 12/1491 711/163 |
| 2010/0031325 | A1* | 2/2010 | Maigne | G06F 9/45533 726/4 |
| 2010/0132046 | A1* | 5/2010 | Saliba | G06F 21/554 726/26 |
| 2012/0117614 | A1* | 5/2012 | Sahita | G06F 12/1491 726/1 |
| 2012/0124572 | A1* | 5/2012 | Cunningham | G06F 9/45558 718/1 |
| 2012/0159245 | A1* | 6/2012 | Brownlow | G06F 11/0712 714/23 |
| 2013/0085880 | A1* | 4/2013 | Roth | G06F 21/602 705/26.1 |
| 2013/0160001 | A1* | 6/2013 | Graham | G06F 9/45558 718/1 |
| 2015/0135255 | A1* | 5/2015 | Theimer | H04L 63/20 726/1 |
| 2015/0199213 | A1* | 7/2015 | Desai | G06F 9/468 718/102 |
| 2015/0381658 | A1* | 12/2015 | Poornachandran | H04L 63/20 726/1 |
| 2016/0149877 | A1* | 5/2016 | Kancharla | H04L 9/0819 713/171 |
| 2018/0189479 | A1* | 7/2018 | Dam | G06F 21/51 |

OTHER PUBLICATIONS

Ganapathy et al., Distributing data for secure database services, 10 pages (Year: 2011).*
French Search Report and Written Opinion dated Oct. 19, 2015 issued in corresponding French Patent Application No. 1402700.

* cited by examiner

METHOD FOR MANAGING AN ARCHITECTURE AND ASSOCIATED ARCHITECTURE

CROSS-REFERENCE TO RELATED APPLICATIONS

The present application claims priority to French Patent Application Serial No. 1402700 filed Nov. 27, 2014, the contents of which are hereby incorporated by reference in its entirety.

FIELD OF THE INVENTION

The present invention relates to a method for managing an architecture. The present invention also relates to the associated architecture.

BACKGROUND OF THE INVENTION

The field of application of the invention corresponds to reconfigurable systems carrying out processing operations with different sensitivity levels and having to partition said processing operations.

Products are notably known integrating safety and cryptographic functions. The functions of an agent for configuring services are an example of safety functions while ciphering, generation of random or pseudo-random numbers and the management of sensitive goods are examples of cryptographic functions.

The safety mechanisms used are generally the subject of evaluation of safety. For their part, the aforementioned products target approvals or certifications. Such products are therefore integrated into reconfigurable safety architectures.

The application of partitioning in products targeting high safety levels comes up against limits of software solutions and involves the use of material properties.

This requires the definition of an architecture combining software functionalities based on mechanisms provided by the hardware executing the software and controlled hardware functionalities.

SUMMARY OF THE INVENTION

Thus, there exists a need for a method for managing an architecture giving both the possibility of guaranteeing the obtaining of flexibility provided by a piece of software and robustness provided by the hardware in the field of the partitioning.

For this, a method for managing an architecture is proposed, the architecture including:
a main platform including a plurality of software execution partitions, and
at least one secondary platform, each secondary platform comprising a plurality of processing members, each processing member being able to apply secured processing operations for the account of at least one partition and each processing member being physically partitioned relatively to the other partitioning members, the method including at least one step:
for associating each partition of the main platform with at least one processing member by installing, for each partition and each processing member, a driver specific to the relevant partition, the driver ensuring a secured link between the relevant partition and the processing member(s) with which the partition is associated.

According to particular embodiments, the method comprises one or several of the following features, taken individually or according to all the technically possible combinations:
each partition includes a first transceiver element and each processing member includes a second transceiver element, each installed secured link being able to ensure encrypted communication between a first transceiver element and a second transceiver element.
the main platform and said at least one secondary platform at least share a communication interface able to ensure data exchange in cutoff between the main platform and said at least one secondary platform. By the expression «the data exchange in cutoff» is meant that the data exchange between the main platform and said at least one secondary platform are ciphered beforehand in cutoff, i.e. encrypted.
the method further includes a step for partitioning the main platform into a plurality of partitions under the control of a hypervisor.
the method further includes a step for partitioning the secondary platform into a plurality of processing members.
each partition is associated with one or several processing members, said processing members not being associated with other partitions.
the main platform is a programmable microprocessor.
the secondary platform is a programmable logic circuit.

Further, the invention also relates to an architecture including:
a main platform including a plurality of software execution partitions, and
at least one secondary platform, each secondary platform comprising a plurality of processing members, each processing member being able to apply processing operations secured for the account of at least one partition and each processing member being physically partitioned relatively to the other processing members,
each partition including a specific driver, each driver ensuring a secured link between the partition and at least one processing member with which the partition is associated.

According to a particular embodiment, each partition is able to apply a man-machine interface allowing a user to access to a service.

BRIEF DESCRIPTION OF THE DRAWINGS

Other features and advantages of the invention will become apparent upon reading the description which follows of embodiments of the invention, only given as an example and with reference to the drawings which are.

DETAILED DESCRIPTION OF PREFERRED EMBODIMENTS

Figure 1:
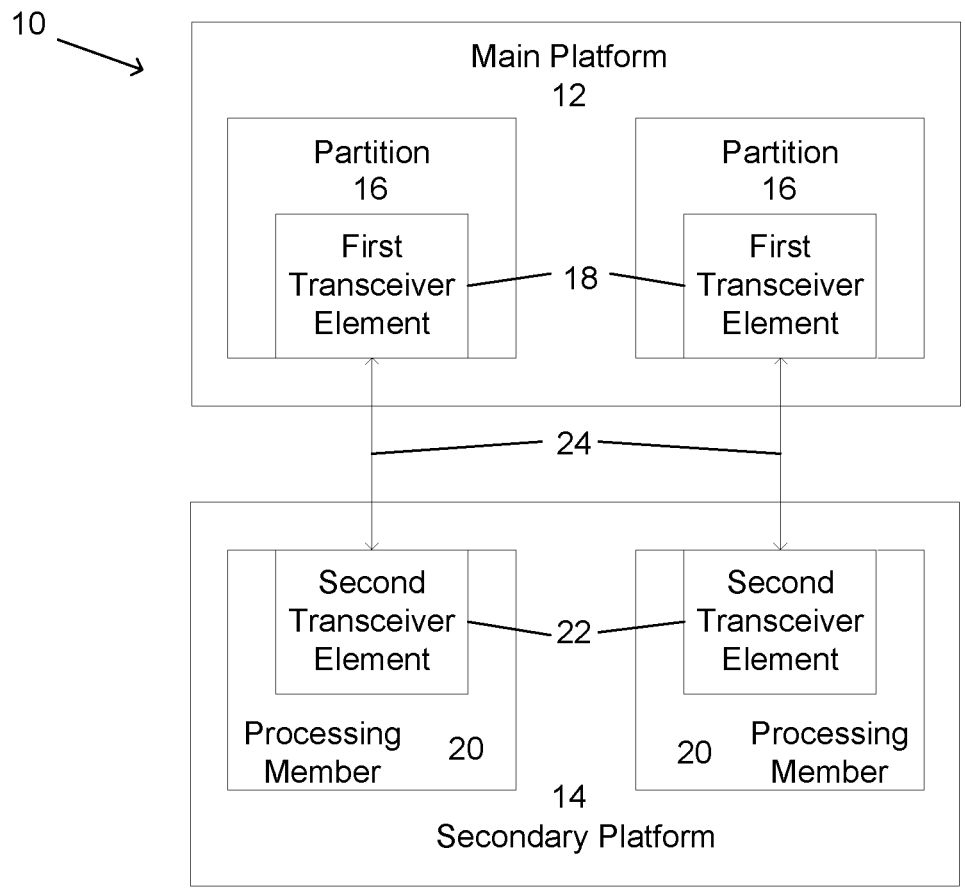
FIG. 1, a schematic illustration of an exemplary architecture, and
FIG. 2, a flowchart of an exemplary application of a management method.

An architecture 10 is illustrated in FIG. 1.
The architecture 10 includes a main platform 12 and a secondary platform 14. Alternatively, the architecture 10 includes a plurality of secondary platforms 14.
The main platform 12 provides functional services for the account of one or several 'user' systems and is the master platform of the architecture 10.

The main platform 12 is able to produce an entire and authentic programming (and reprogramming) mechanism, an entire and authentic starting mechanism, a mechanism for partitioning the processing operations which the main platform 12 executes and a mechanism for communicating with the secondary platform 14.

The main platform 12 is able to partly execute interpreted logic instructions (i.e. its operation is particularized as computer programs). These programs execute on platform resources including one or several GPP (acronym of «general purpose processor») processors themselves integrating one or several cores or a SOC (acronym of «system on chip») integrating one or several cores associated with native functionalities: peripherals, ports, GPU . . .

Certain functions and certain resources ensure security performing operations for the account of the main platform 12 and relying on specific resources such as cryptographic accelerators.

The main platform 12 is a software platform.

As an example, the main platform 12 is a programmable microprocessor.

The main platform 12 includes a plurality of partitions 16 for executing the software.

According to an embodiment, each partition 16 is able to simultaneously operate with the other partition 16.

According to another embodiment, each partition 16 is able to operate independently under the control of an intra-platform partitioning mechanism.

A hypervisor is an example of intra-platform partitioning mechanism.

Further, each partition 16 is able to operate according to a first policy, the first policy managing the partitioning between the partitions 16.

According to a particular embodiment, each partition 16 is able to apply a man-machine interface allowing a user to access a service.

In the particular case of FIG. 1, each partition 16 includes a first transceiver element 18.

Generally, in the computer background, the first transceiver element 18 is referred to as a "handler".

The secondary platform 14 is able to provide additional services (to the services executed by the main platform 12).

The secondary platform 14 is able to apply an entire and authentic programming (and reprogramming) mechanism, an entire and authentic starting mechanism, a mechanism for partitioning the processing operations which the secondary platform 14 executes and a mechanism for communication towards the main platform 12.

The main platform 12 is a hardware platform.

According to a particular example, the secondary platform 14 is a programmable logic circuit.

As an illustration, the main platform 12 implements wired logic (ASIC) or pseudo-wired logic (FPGA) giving the possibility of carrying out specific processing operations (typically cryptographic engines) for which execution may be guaranteed and confined.

Each secondary platform 14 comprises a plurality of processing members 20.

Each processing member 20 is able to apply secured processing operations for the account of at least one partition 16.

More specifically, each processing member 20 is able to apply security mechanisms for the account of applications executing on the main platform 12.

Further, each processing member 20 is physically partitioned relatively to the other processing members 20.

Such physical partitioning is compliant with a second policy, the second policy managing the partitioning between the processing members 20.

Each processing member includes a second transceiver element 22.

Like for the first transceiver element 18, the second transceiver element 22 is commonly referred to as a «handler».

Further, each partition 16 includes a specific driver 24, each driver 24 ensuring a secured link between the partition 16 and at least one processing member 20 with which the partition 16 is associated.

By the expression of «secured link», is meant a security link of the cryptographic type.

In the particular case of FIG. 1, each installed secured link is able to ensure encrypted communication between the first transceiver element 18 and a second transceiver element 22.

More specifically, the communication between the first transceiver element 18 and a second transceiver element 22 is a communication controlled and protected by the cipher.

According to the example illustrated by FIG. 1, the main platform 12 and at least one secondary platform 14 share at least one communication interface capable of ensuring exchange of data in cut-off between the main platform 12 and at least one secondary platform 14. The communication interface is not illustrated in FIG. 1.

Preferably, the communication interface also ensures non-circumvention of the exchange data.

The application of the transceiver elements 18 and 20 in cut-off on the exchange flows between the main platform 12 and a secondary platform 14 allow the application of a policy for controlling flows and for protecting with the cipher the flows between the partitions 16 and the processing members 20. The application of the flow control policy and cipher-protection gives the possibility of extending the partitioning policies between the partition 16 and between the processing members 20 on the whole of the exchanges between the main platform 12 and the secondary platform 16.

Figure 2:
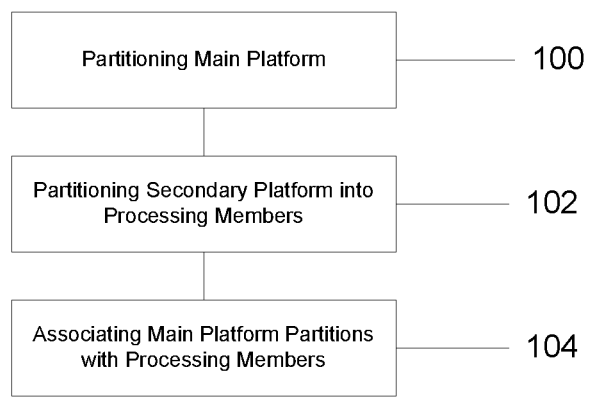

The operation of the architecture 10 of FIG. 1 is now described with reference to FIG. 2 which illustrates an application example of a method for managing the architecture 10.

The method includes a first step 100 for partitioning the main platform 12.

During the first step, the main platform 12 is partitioned into a plurality of partitions 16 under the control of a hypervisor.

The method also comprises a second step 102 for partitioning the secondary platform 14.

During the second step, the secondary platform 14 is partitioned into a plurality of processing members 20.

The method also includes a third association step 104.

During the third step, each partition of the main platform 12 is associated with at least one processing member 20.

Such an association is applied by installing, for each partition 16 and each processing member 20, the driver 24 specific to the relevant partition 16.

The driver 24 ensures a secured link between the relevant partition 16 and the processing member(s) 20 with which the partition 16 is associated.

According to the specific example of architecture 10 of FIG. 1, each installed secured link is able to ensure encrypted communication between the first transceiver element 18 and the second transceiver element 22.

Preferably, each partition 16 is associated with one or several processing members 20, said processing members 20 not being associated with other partitions 16.

According to a particular example, each partition 16 is associated with a single processing member 20. In such a case, in a specific embodiment, certain processing members 20 are not associated with any partition 16.

Thus it appears that the method for managing an architecture gives the possibility of both guaranteeing the obtaining of the flexibility provided by a piece of software and the robustness provided by the hardware in the field of the partitioning.

More specifically, the architecture 10 is a security architecture by distributed co-partitioning of the hardware and of the software.

The architecture 10 proposed has the advantage of being reconfigurable according to the desires of the user.

By comparison, the conventional architectures of the known state of the art produce logical partitionings, the range of which is limited to the capabilities of the hardware provided by the used COTS. Certain types of processing and certain sensitivity levels of processing operations will imply the out-sourcing of these processing operations in specific peripherals having the suitable hardware capabilities.

These architectures are notably those deployed in terminals ensuring cryptographic processing operations locally of the platform (for example secured storage) or for the account of an application (for example control of transactions). The multilevel and reconfigurable architectures also imply the implementation of partitionings on the processing operations. These partitioning architectures are however limited to the software perimeter executing on the processors (GPP for example) and are limited to the external interfaces of these processors. Such a limitation is reinforced by the reconfigurability of the relevant architectures. Moreover, the application of specific hardware resources to certain processing operations is considered as establishing a peripheral (co-processor) not linked with any possible partitioned processing operations at the main processor.

The proposed architecture 10 therefore gives the possibility of both achieving confidence areas with the benefit of strong partitionings based on hardware properties, software confidence areas benefiting from software partitionings based on hardware properties and making consistent both previous partitioning levels.

More specifically, the architecture 10 ensures a consistent and homogenous distribution between the partitionings of the processing operations supported by the main platform 12 and the processing operations ensured by the secondary platforms 14.

Thus, consistency of the configurations of the mechanisms for communicating with the configurations of the partitioning mechanisms is ensured for processing operations executed on the main platform 12 and the secondary platforms 14. A consistent distribution gives the possibility of ensuring that the exchanges are secured, the processing operations executed on the main platform 12 and the secondary platforms 14. This securization is achieved by intercepting the flows leaving a platform 12, 14 and protection (confidentiality/integrity/anti-replay) by the ciphering in cut-off and end-to-end between a main or secondary platform transmitting towards the main platform 12 or the intended secondary platform 14.

Advantageously, the architecture 10 also allows authentication of the drivers 24 sharing the same partitioning level.

Further, the cryptographic mechanisms desired for the protection are executed in specific and partitioned memory areas. This memory partitioning is obtained by physical partitioning mechanisms specific to programmable logic circuits of the FPGA or ASIC type.

The partitioning of the main platform is, as for it, achieved via mechanisms of the memory management unit (MMU) type or by a specific hardware partitioning (filtered and specific memory addressing) applied by the piece of software being executed on the main platform.

According to a preferred embodiment, the partitioning of the main platform may be reinforced by using a mechanism of the input-output memory management unit (IOMMU) type.

Any direct access between the inter-platform processing operations is also forbidden, i.e. without any preliminary processing operation by protection by the ciphering in cut-off. The consistency between the partitions and the exchanges is reinforced by the consistency of the share of the cryptographic keys ensuring protection by the ciphering of the exchanges.

The distribution of the keys may be handled by a main platform 'system' (mandatory access control) or left to the discretion of the main platforms using the processing operations of the secondary platforms (discretionary access control). The main platform 12 and the secondary platforms 14 allow to communicate share one or several cryptographic keys for protecting the exchanges. These keys are pre-placed keys or negotiated between the platforms and observing the consistency of the configurations. The keys may also request the platform to randomly generate cryptographic data for establishing protection keys. These requests may resort to mechanisms of the random generator type or physically unclonable function (PUF).

As a summary, the architecture 10 proposed as well as the management method allow flexible and distributed utilization of the resources. Further, the flows of exchanged data via the secured link are protected, which allows limitation of the impact of the sharing of resources on the security. Further, portability on different hardware architectures is allowed. In particular, this results in a multiplicity of the possible applications, notably for computer phones, tablets, portable mini-computers or servers.

The invention claimed is:

1. A method for managing an architecture, the architecture comprising:
   a main platform comprising a plurality of partitions executing software, wherein the main platform is a programmable microprocessor, and
   at least one secondary platform each secondary platform comprising a plurality of processing members, said at least one secondary platform being a programmable microprocessor, and each processing member being able to apply secured processing operations for the account of at least one partition and each processing member being physically partitioned relatively to the other processing members, wherein the main platform and said at least one secondary platform at least share a communication interface able to ensure exchange of data in cut-off between the main platform and said at least one secondary platform,
   wherein each partition comprises a first transceiver element and each processing member comprises a second transceiver element,
   the method comprising at least:
   associating each partition of the main platform with at least one processing member by installing, for each partition and each processing member, a driver specific to the relevant partition, the driver ensuring a secured link between the relevant partition and the processing member with which the partition is associated, and providing encrypted communication between the first transceiver element and the second transceiver element over each installed secured link.

2. The method according to claim 1, wherein the method further comprises:
partitioning of the main platform into a plurality of partitions under the control of a hypervisor.

3. The method according to claim 1, wherein the method further comprises:
partitioning of the secondary platform into a plurality of processing members.

4. The method according to claim 1, wherein each partition is associated with one or several processing members, said processing members not being associated with other partitions.

5. The method according to claim 1, wherein the main platform is a programmable microprocessor.

6. The method according to claim 1, wherein the secondary platform is a programmable logic circuit.

7. A secure system comprising:
a main platform, wherein the main platform is a programmable microprocessor, the main platform including:
a plurality of partitions for executing software; and
a plurality of first transceiver elements, each first transceiver element being associated with one of the partitions;
at least one secondary platform, said at least one secondary platform being a programmable microprocessor, wherein the main platform and said at least one secondary platform at least share a communication interface able to ensure exchange of data in cut-off between the main platform and said at least one secondary platform, and wherein each secondary platform comprises:
a plurality of processing members; and
a plurality of second transceiver elements, each second transceiver element being associated with one of the processing members, and
a specific driver disposed on each partition,
wherein each processing member applies processing operations secured for the account of at least one partition,
wherein each processing member being physically partitioned relatively to the other processing members, wherein each driver ensuring a secured link between the partition and at least one processing member with which the partition is associated, and wherein the secured link provides encrypted communication between the first transceiver element associated with the partition and the second transceiver element associated with the at least one processing member.

8. The system according to claim 7, wherein each partition is able to apply a man-machine interface allowing a user to access a service.

9. A method for managing an architecture, the architecture comprising:
a main platform comprising a plurality of partitions executing software, wherein the main platform is a programmable microprocessor, and
at least one secondary platform, said at least one secondary platform being a programmable logic circuit, and each secondary platform comprising a plurality of processing members, each processing member being able to apply secured processing operations for the account of at least one partition and each processing member being physically partitioned relatively to the other processing members, wherein the main platform and said at least one secondary platform at least share a communication interface able to ensure exchange of data in cut-off between the main platform and said at least one secondary platform,
wherein each partition comprises a first transceiver element and each processing member comprises a second transceiver element, and
wherein each partition is associated with one or several processing members, said processing members not being associated with other partitions, the method comprising at least:
associating each partition of the main platform with at least one processing member by installing, for each partition and each processing member, a driver specific to the relevant partition, the driver ensuring a secured link between the relevant partition and the processing member with which the partition is associated, and
providing encrypted communication between the first transceiver element and the second transceiver element over each installed secured link.

* * * * *